(12) United States Patent
McCune et al.

(10) Patent No.: US 10,267,232 B2
(45) Date of Patent: Apr. 23, 2019

(54) OIL BAFFLES IN CARRIER FOR A FAN DRIVE GEAR SYSTEM

(71) Applicant: United Technologies Corporation, Hartford, CT (US)

(72) Inventors: Michael E. McCune, Colchester, CT (US); Marc J. Muldoon, Marlborough, CT (US)

(73) Assignee: United Technologies Corporation, Farmington, CT (US)

(*) Notice: Subject to any disclaimer, the term of this patent is extended or adjusted under 35 U.S.C. 154(b) by 755 days.

(21) Appl. No.: 14/763,535

(22) PCT Filed: Jan. 24, 2014

(86) PCT No.: PCT/US2014/012907
§ 371 (c)(1),
(2) Date: Jul. 27, 2015

(87) PCT Pub. No.: WO2014/123704
PCT Pub. Date: Aug. 14, 2014

(65) Prior Publication Data
US 2016/0010549 A1 Jan. 14, 2016

Related U.S. Application Data

(60) Provisional application No. 61/761,335, filed on Feb. 6, 2013.

(51) Int. Cl.
*F02C 7/06* (2006.01)
*F02C 7/36* (2006.01)
(Continued)

(52) U.S. Cl.
CPC ............... *F02C 7/06* (2013.01); *F01D 5/02* (2013.01); *F02C 3/04* (2013.01); *F02C 7/36* (2013.01);
(Continued)

(58) Field of Classification Search
CPC ....... F02C 7/06; F02C 7/36; F02C 3/04; F02C 3/107; F02C 7/32; F01D 5/02;
(Continued)

(56) References Cited

U.S. PATENT DOCUMENTS 4,827,712 A * 5/1989 Coplin .................... F02K 3/06
415/210.1
5,472,383 A 12/1995 McKibbin
(Continued)

FOREIGN PATENT DOCUMENTS

DE 3410977 A1 9/1985
WO 95/18319 A1 7/1995

OTHER PUBLICATIONS

Ciepluch et al., Quiet, Powered-Lift Propulsion, NASA Conference Publication 2077, Nov. 14-15, 1978.
(Continued)

*Primary Examiner* — Phutthiwat Wongwian
*Assistant Examiner* — Loren Edwards
(74) *Attorney, Agent, or Firm* — Carlson, Gaskey & Olds, P.C.

(57) ABSTRACT

A gearbox assembly for a gas turbofan engine includes a sun gear rotatable about an axis and a plurality of intermediate gears driven by the sun gear. A baffle disposed between at least two of the plurality of intermediate gears includes a first gap distance within a first gap portion and a second gap distance within a second gap portion. The first gap portion is disposed between the baffle and one of the intermediate gears away from the meshed interface with the sun gear and the second gap portion is disposed near the interface with the sun gear. The first gap distance within the first gap portion is different than the second gap distance within the second gap portion to define a desired lubricant flow path.

15 Claims, 6 Drawing Sheets

(51) Int. Cl.
*F16H 57/08* (2006.01)
*F16H 57/04* (2010.01)
*F01D 5/02* (2006.01)
*F02C 3/04* (2006.01)

(52) U.S. Cl.
CPC ..... *F16H 57/0423* (2013.01); *F16H 57/0427* (2013.01); *F16H 57/0482* (2013.01); *F16H 57/0486* (2013.01); *F16H 57/082* (2013.01); *F05D 2220/36* (2013.01); *F05D 2240/24* (2013.01); *F05D 2240/35* (2013.01); *F05D 2260/40311* (2013.01); *F05D 2260/98* (2013.01)

(58) Field of Classification Search
CPC .......... F01D 15/12; F01D 25/18; F01D 25/20; F16H 57/0423; F16H 57/0427; F16H 57/0482; F16H 57/0486; F16H 57/082; F05D 2220/36; F05D 2240/24; F05D 2240/35; F05D 2260/40311; F05D 2260/98; F02K 3/06
USPC .......................................................... 60/805
See application file for complete search history.

(56) References Cited

U.S. PATENT DOCUMENTS

| | | |
|---|---|---|
| 6,223,616 B1 * | 5/2001 | Sheridan ............... F16H 1/2827 184/6.12 |
| 7,704,178 B2 | 4/2010 | Sheridan et al. |
| 7,883,439 B2 | 2/2011 | Sheridan et al. |
| 7,963,186 B2 | 6/2011 | Hayes et al. |
| 8,276,275 B2 | 10/2012 | Sheridan et al. |
| 2008/0006018 A1 | 1/2008 | Sheridan et al. |
| 2012/0189430 A1 | 7/2012 | McCune et al. |
| 2012/0243971 A1 | 9/2012 | McCune et al. |
| 2012/0277055 A1 | 11/2012 | Sheridan |

OTHER PUBLICATIONS

Gunston, Bill, Jane's Aero-Engines, pp. 510-512.
International Search Report and Written Opinion for International Application No. PCT/US2014/012907 dated May 2, 2014.
European Search Report for EP Application No. 14749166.6 dated Jan. 19, 2016.
International Preliminary Report on Patentability for International Application No. PCT/US2014/012907 dated Aug. 20, 2015.

* cited by examiner

OIL BAFFLES IN CARRIER FOR A FAN DRIVE GEAR SYSTEM

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A speed reduction device such as an epicyclical gear assembly may be utilized to drive the fan section such that the fan section may rotate at a speed different than the turbine section so as to increase the overall propulsive efficiency of the engine. Lubrication of the gear assembly is achieved by directing lubricant to each of the gear interfaces. Lubricant is desired to flow though the gear interface and then be exhausted to maintain a desired temperature. Excess lubricant or lubricant that is recirculated can generate additional heat and reduce gear efficiency.

Accordingly, it is desirable to design and develop lubricant systems that prevents excess lubricant accumulation and directs lubricant through the gear assembly.

SUMMARY

A gearbox assembly for a gas turbofan engine according to an exemplary embodiment of this disclosure, among other possible things includes a sun gear rotatable about an axis, a plurality of intermediate gears driven by the sun gear and a baffle disposed between at least two of the plurality of intermediate gears. The baffle is spaced a first gap distance from the at least two intermediate gears within a first gap portion and a second gap distance different than the first gap distance from one of the at least two intermediate gears within a second gap portion including an interface with the sun gear.

In a further embodiment of the foregoing gearbox assembly, the second gap distance is larger than the first gap distance.

In a further embodiment of any of the foregoing gearbox assemblies, the second gap distance is between about 1.5 and about 2.5 greater than the first gap distance.

In a further embodiment of any of the foregoing gearbox assemblies, the sun gear includes a cavity and the baffle includes a wedge extending into the cavity for circulating lubricant out of the cavity.

In a further embodiment of any of the foregoing gearbox assemblies, includes a carrier supporting the intermediate gears relative to the sun gear and a ring gear circumscribing the intermediate gears. A ring gear baffle is supported on the carrier.

In a further embodiment of any of the foregoing gearbox assemblies, the ring gear baffle includes a wedge extending into a cavity defined on the sun gear.

In a further embodiment of any of the foregoing gearbox assemblies, the baffle defines a lubricant flow path around the at least two intermediate gears.

A turbofan engine according to an exemplary embodiment of this disclosure, among other possible things includes a fan rotatable about an axis, a core engine section disposed about the axis, and a geared assembly driven by the core engine section for rotating the fan about the axis. The gear assembly includes a sun gear rotatable about an axis. A plurality of intermediate gears is driven by the sun gear. A baffle is disposed between at least two of the plurality of intermediate gears. The baffle is spaced a first gap distance from the at least two intermediate gears within a first gap portion and a second gap distance different than the first gap distance from one of the at least two intermediate gears within a second gap portion including an interface with the sun gear.

In a further embodiment of the foregoing turbofan engine, the second gap distance is larger than the first gap distance.

In a further embodiment of any of the foregoing turbofan engines, the second gap distance is between about 1.5 and about 2.5 greater than the first gap distance.

In a further embodiment of any of the foregoing turbofan engines, the sun gear includes a cavity and the baffle includes a wedge extending into the cavity for circulating lubricant out of the cavity.

In a further embodiment of any of the foregoing turbofan engines, includes a carrier supporting the intermediate gears relative to the sun gear and a ring gear circumscribing the intermediate gears. A ring gear baffle is supported on the carrier.

In a further embodiment of any of the foregoing turbofan engines, the ring gear baffle includes a wedge extending into a cavity defined on the sun gear.

In a further embodiment of any of the foregoing turbofan engines, the baffle defines a lubricant flow path around the at least two intermediate gears.

A method of assembling a fan drive gear system according to an exemplary embodiment of this disclosure, among other possible things includes supporting a sun gear within a carrier, mounting a plurality of intermediate gears within the carrier in meshed engagement with the sun gear, mounting a ring gear circumscribing the plurality of intermediate gears, and mounting at least one baffle between at least two of the plurality of intermediate gears that define a first gap distance between the intermediate gears within a first gap portion and second gap distance different than the first gap distance within a second gap portion proximate the meshed engagement between the intermediate gears and the sun gear.

In a further embodiment of the foregoing method, includes defining the second gap distance to be greater than the first gap distance for defining a lubricant flow path away from the meshed engagement between the intermediate gears and the sun gear.

In a further embodiment of any of the foregoing methods, includes defining the second gap distance to be between about 1.5 and about 2.5 greater than the first gap distance.

In a further embodiment of any of the foregoing methods, includes extending a wedge of the baffle into a cavity of the sun gear for circulating lubricant from the cavity.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
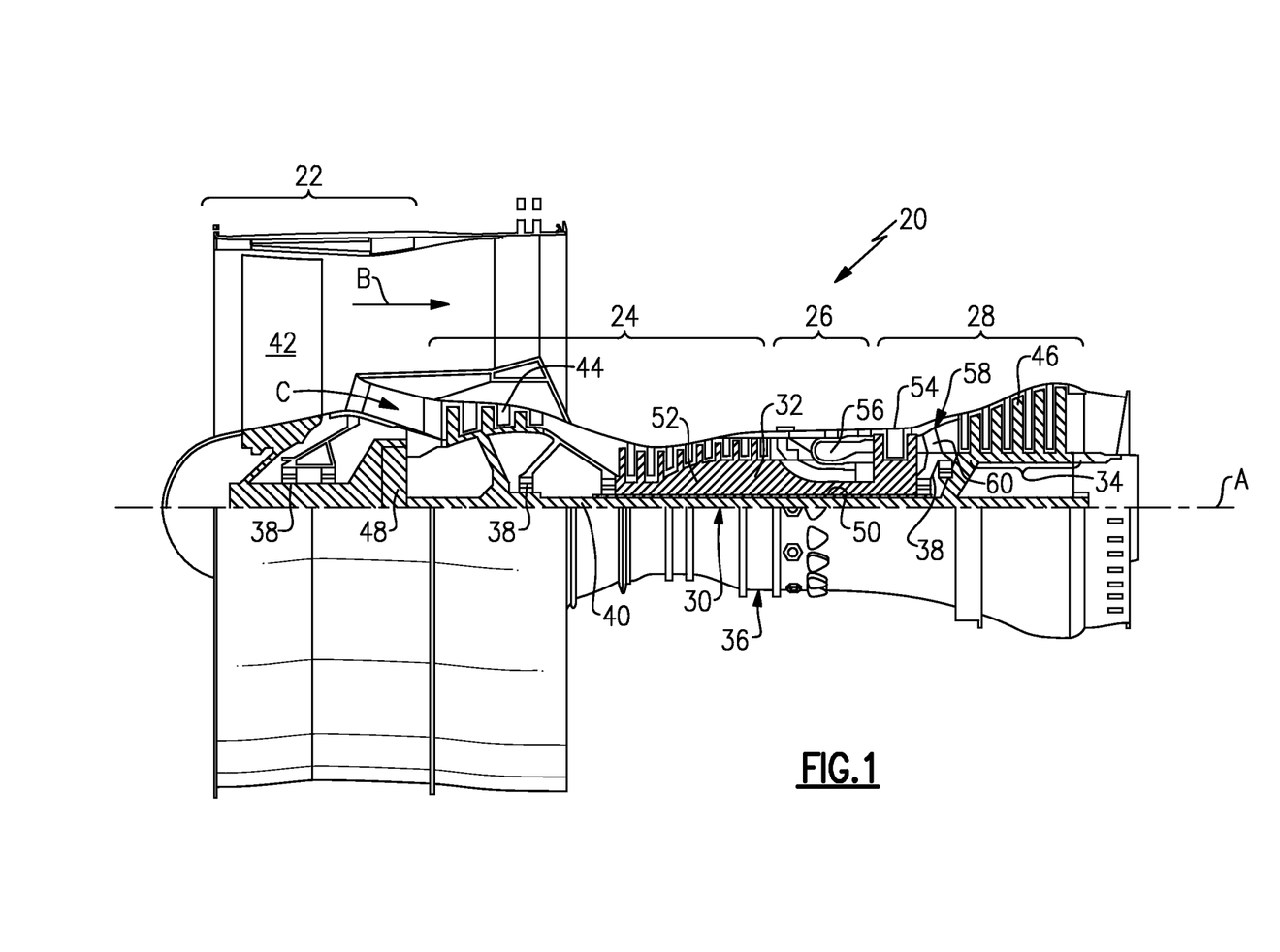
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
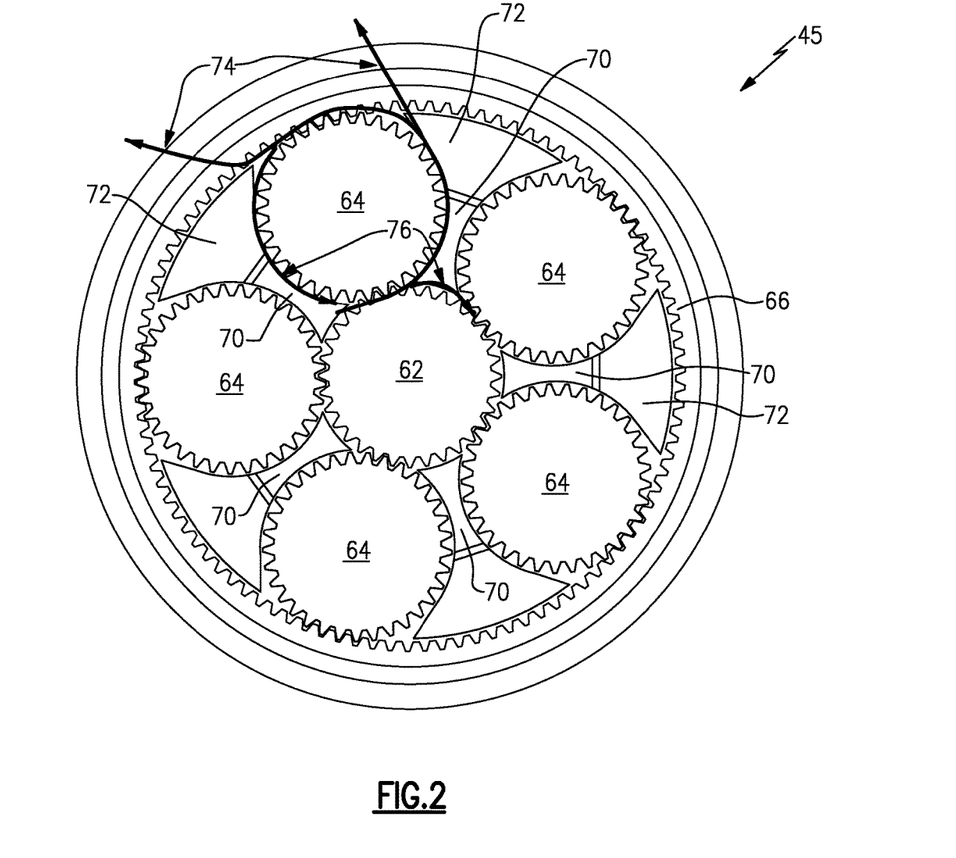
FIG. 2 is a schematic view of an example fan drive gear system.
Figure 3:
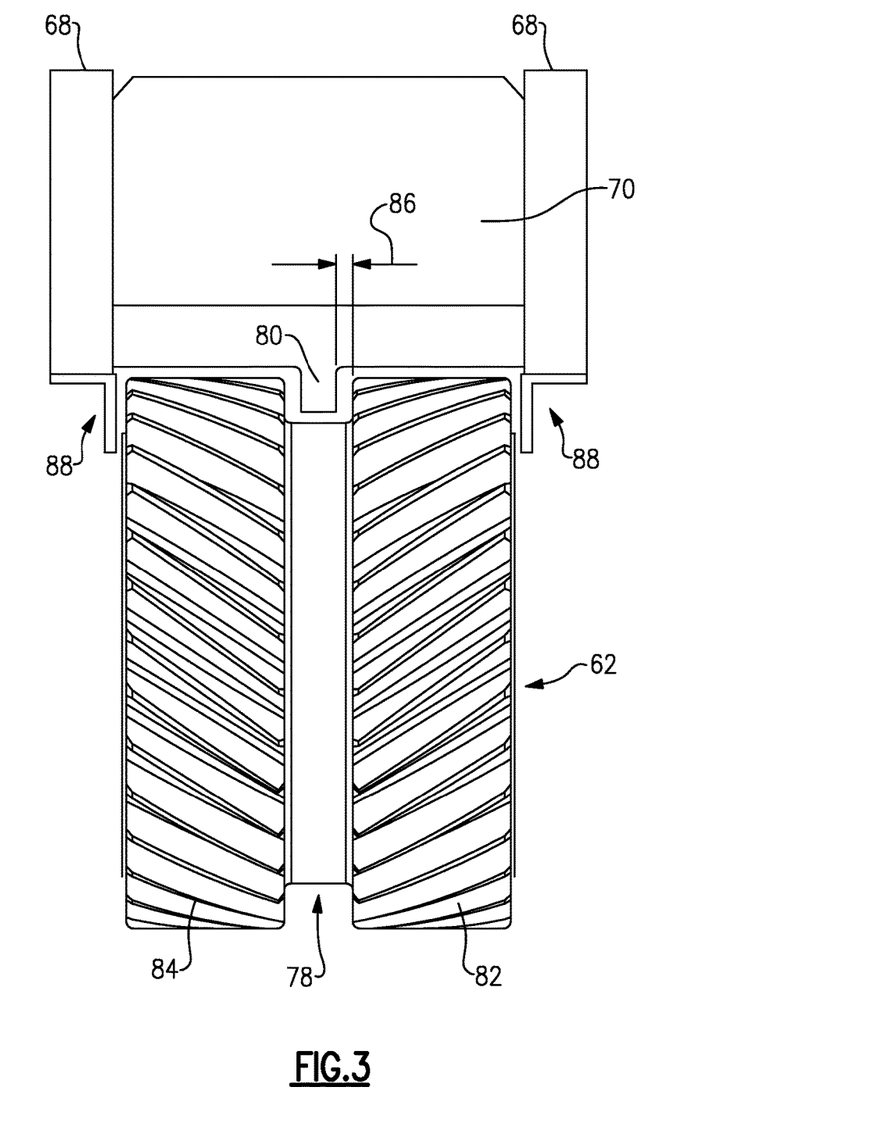
FIG. 3 is a side view of an example sun gear for the fan drive gear system.
Figure 4:
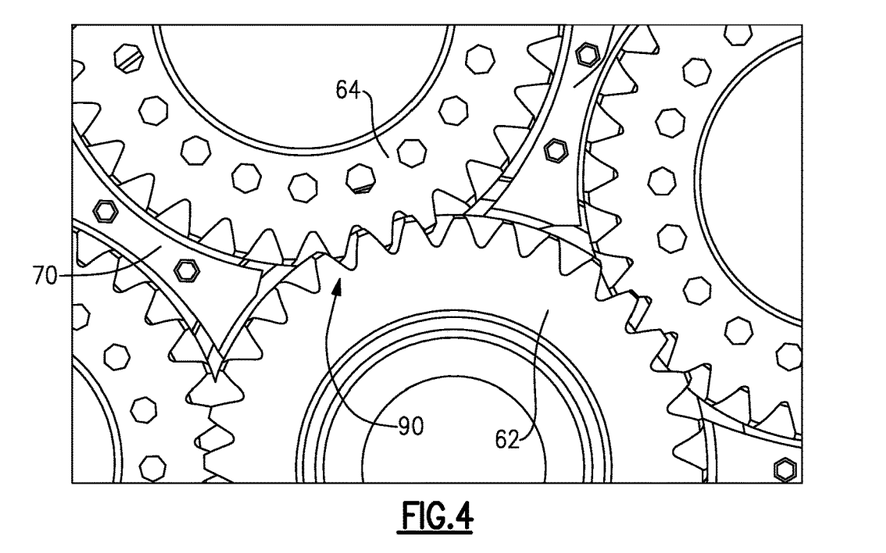
FIG. 4 is an enlarged view of a meshing engagement of a portion of the example fan drive gear system.

Referring to FIGS. 2, 3, and 4, the example geared architecture 48 includes a gearbox generally indicated at 45 that receives lubricant that is intended to flow into the interface between locations where gear teeth mesh and then to exit the gearbox 45. Oil introduced into the gear mesh is intended to cool and lubricate a single mesh and then exit the gear box 45 as efficiently as possible.

Adjacent gear meshes include their own dedicated oil jetting and lubricant flow paths. Excessive flow or flow of lubricant between gear meshes can reduce overall gear efficiency and generate additional heat. Accordingly, the example gearbox 45 includes a baffle system that follows the gear profile to generally direct oil flow and reduce air windage losses. The spacing between the baffles and gears in typical gear systems is substantially uniform. However, uniform spacing between the baffle and gear meshes does not fully provide the desired pumping an exhaustion of lubricant from the gear mesh.

Lubricant that flows along non-desired flow paths reduces efficiency and can create higher temperatures within the gear box 45. Accordingly, the example baffle assemblies include features that prevent extra oil from being recirculated through non-desired oil paths.

Figures 8, 9, 10:
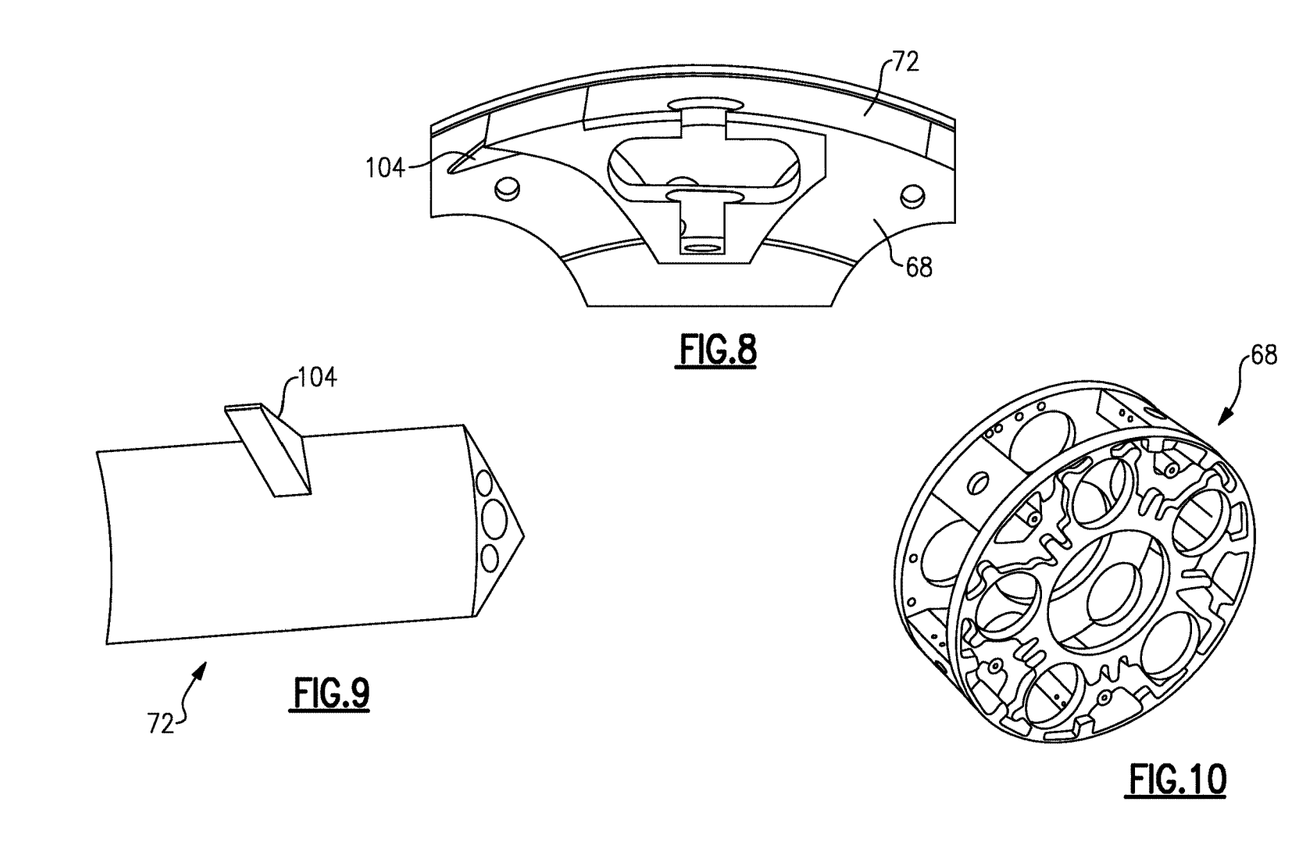
FIG. 8 is a perspective view of an example ring baffle for the fan drive gear system.
FIG. 9 is a perspective view of the example baffle.
FIG. 10 is a perspective view of an example carrier assembly for the fan drive gear system.

The example gear box 45 includes a sun gear 62 that drives and is in meshed engagement with a plurality of intermediate gears 64. The intermediate gears 64 are often referred to as either star gears or planet gears. Star gears rotate about fixed axes, whereas planet gears are supported on axes that rotate about the sun gear 62. In this example, the intermediate gears 64 are referred to as star gears 64 and are supported by a carrier assembly 68 (Best shown in FIGS. 3 and 10). The carrier assembly 68 is fixed such that the star gears 64 rotate about fixed axes. A ring gear 66 circumscribes the plurality of star gears 64 and is in meshing engagement with each of the star gears 64. A first baffle 70 is disposed between each of the star gears 64 proximate the meshing engagement with the sun gear 62.

The baffles 70 define a desired oil lubricant flow path indicated at 74 and prevent lubricant flow through non-desired flow paths indicated by arrows 76. A second baffle 72 is provided adjacent to the meshing engagement between the star gears 64 and the ring gear 66. Each of the baffles 70, 72 include spacings that provide for the pumping and flow of lubricant along the desired flow path 74.

Referring to FIG. 3, the example sun gear 62 includes a center cavity region 78 that is disposed between a first region 82 and a second region 84. In this example, the sun gear 62 includes alternating or oppositely facing helical gears that substantially cancel axial thrust loads. The cavity 78 disposed between the gear regions 82 and 84 may accumulate lubricant and therefore the baffle 70 includes a wedge portion 80 that extends into the cavity 78. The wedge portion 80 facilitates evacuation of lubricant from the cavity 78 along the desired lubricant flow path 74. Moreover, the star gears 64 that engage the sun gear 62 include corresponding first and second regions separated by a cavity.

The wedge portion 80 is spaced a distance 86 from interior sides of the cavity 78. The carrier 68 includes side baffles 88 that maintain lubricant within the desired flow path 74 and within the gear interface.

Figure 5:
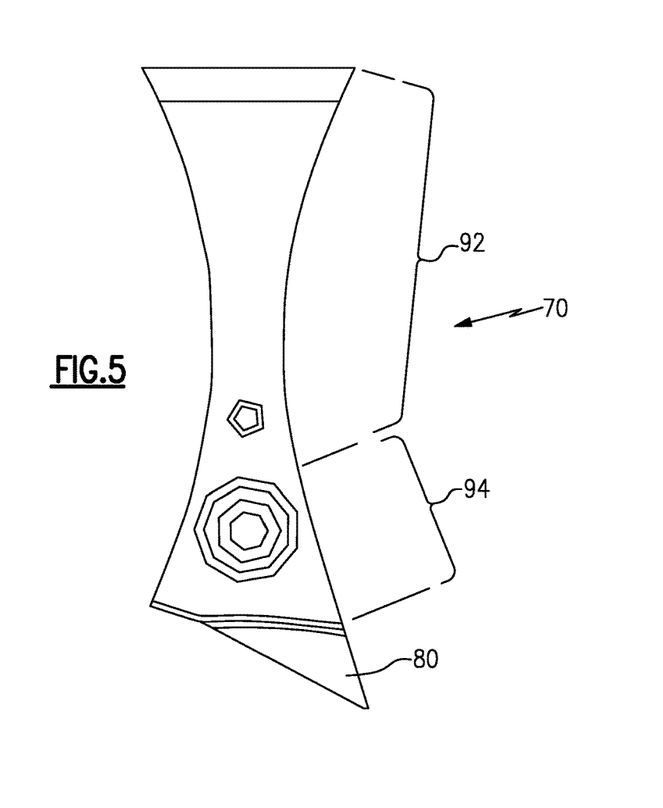
FIG. 5 is a side view of an example baffle.
Figure 6:
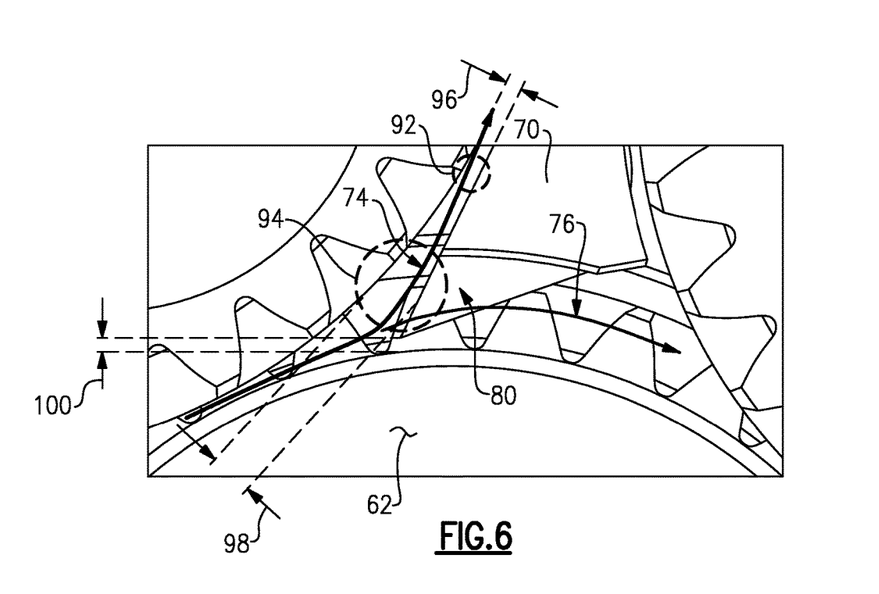
FIG. 6 is an enlarged view of an example meshing engagement and baffle orientation within the example fan drive gear system.
Figure 7:
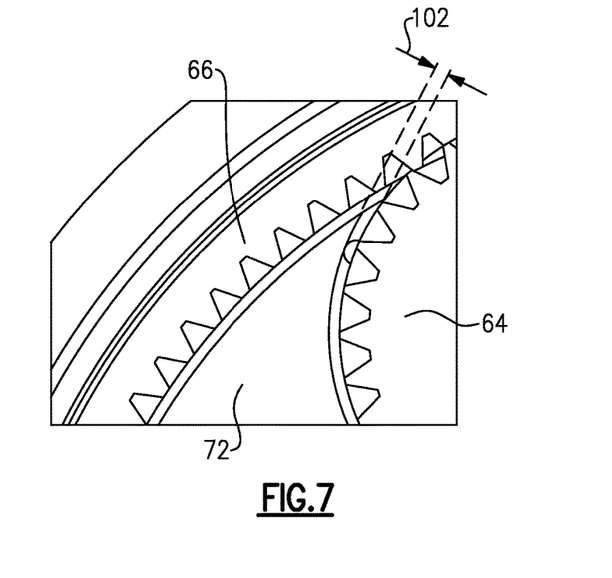
FIG. 7 is another enlarged view of another baffle within the example fan drive gear system.

Referring to FIGS. 4, 5, and 6, the example meshing engagement 90 between the sun gear 62 and one of the star gears 64 is shown in comparison to the location of the first baffle 70. Each of the baffles 70 include the wedge portion 80 that extend into the cavity 78. The gap between the star gear 64 and the baffle 70 includes a first portion 92 and a second portion 94, both of which are tangential to, or circumscribes the adjacent star gear. The first gap portion 92 is disposed substantially around the star gear 64 and spaced away from the meshing engagement 90 with the sun gear 62. The second gap portion 94 is disposed near the meshing engagement 90 (FIG. 4) and provides for a preferential spacing between the star gear 64 and the baffle 70. In this example, the first gap portion 92 is spaced apart a first gap distance 96 from the corresponding intermediate gear 64. The second gap portion 94 is spaced apart a second distance 98. The second distance 98 is greater than the first gap distance 96.

A third gap portion 100 extends radially and/or normally to the sun gear 62 is further provided between the wedge 80 that extends into the cavity 78 and a bottom portion of the cavity 78 to provide the desired pumping and evacuation of lubricant along the desired flow path indicated at 74.

The first gap portion 92 provides a desired lubricant path away from the meshing engagement 90 between the sun gear 62 and the star gear 64. The second gap portion 94 includes the second gap distance 98 that is greater than the first gap distance 96 and provides for the reduction of resistance to lubricant flow to facilitate lubricant flow along the desired flow paths 74 instead of past the wedge 80 along the non-desired flow path 76.

In this example, the second gap distance 98 is between about 1.5 and about 2.5 times larger than the first gap distance 96. The increased distance reduces the resistance to lubricant flow along the desired flow path 74 while making lubricant flow along the non-desired flow path indicated at 76 more difficult and less likely.

Referring to FIGS. 7, 8, 9, and 10 with continued reference to FIG. 6, the desired flow path 74 of lubricant continues between the second baffle 72 that is disposed proximate to the geared meshing interface between the star gear 64 and ring gear 66. In this example, the spacing 102 between the baffle 72 and the star gear 64 is substantially equal to the first gap distance 96. Lubricant along the flow path through the spacing 102 is along a substantially desired lubricant flow path and provides for exhausting of lubricant away from the meshing engagement between the star gear 64 and the ring gear 66.

The second baffle 72 further includes the wedge portion 104 that extends between the star gears 64 to further exhaust lubricant from the carrier assembly 68. The wedge portion 104 extends into a cavity defined between gear portions of the star gears 64 to prevent lubricant from being recirculated and/or reingested into the carrier assembly 68. The example baffle 72 provides for the formation of the desired lubricant flow path 74 away from the meshing engagement to provide a constant circulation of lubricant through the meshing interfaces between gears of the example gearbox 45. Continual flow of lubricant through the gearbox 45 provides the desired efficiency and maintains each of the gear structures within a desired thermal range. Accordingly, the specific clearances provide the desired lubricant pumping feature and process to maintain the disclosed gearbox 45 within optimal operating ranges.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gearbox assembly for a gas turbofan engine comprising:
    a sun gear rotatable about an axis, the sun gear including a first gear region and a second gear region and including a cavity disposed between the first gear region and the second gear region;
    a plurality of intermediate gears driven by the sun gear;
    a baffle disposed between at least two of the plurality of intermediate gears, wherein the baffle is spaced a first gap distance from the at least two intermediate gears within a first gap portion and a second gap distance different than the first gap distance from one of the at least two intermediate gears within a second gap portion including an interface with the sun gear, wherein the baffle includes a wedge extending into the cavity of the sun gear for circulating lubricant out of the cavity.

2. The gearbox assembly as recited in claim 1, wherein the second gap distance is larger than the first gap distance.

3. The gearbox assembly as recited in claim 1, wherein the second gap distance is between 1.5 and 2.5 times greater than the first gap distance.

4. The gearbox assembly as recited in claim 1, including a carrier supporting the intermediate gears relative to the sun gear and a ring gear circumscribing the intermediate gears, wherein a ring gear baffle is supported on the carrier.

5. The gearbox assembly as recited in claim 4, wherein the ring gear baffle includes a wedge extending into a cavity defined between gear regions of the intermediate gears.

6. The gearbox assembly as recited in claim 1, wherein the baffle defines a lubricant flow path around the at least two intermediate gears.

7. A turbofan engine comprising:
    a fan rotatable about an axis;
    a core engine section disposed about the axis; and
    a geared assembly driven by the core engine section for rotating the fan about the axis, the gear assembly including a sun gear rotatable about an axis, a plurality of intermediate gears driven by the sun gear, and a baffle disposed between at least two of the plurality of intermediate gears, wherein the baffle is spaced a first gap distance from the at least two intermediate gears within a first gap portion and a second gap distance different than the first gap distance from one of the at least two intermediate gears within a second gap portion including an interface with the sun gear, wherein the sun gear includes a first gear region and a second gear region and a cavity between the first and second gear regions and the baffle includes a wedge extending into the cavity for circulating lubricant out of the cavity of the sun gear.

8. The turbofan engine as recited in claim 7, wherein the second gap distance is larger than the first gap distance.

9. The turbofan engine as recited in claim 7, wherein the second gap distance is between 1.5 and 2.5 times greater than the first gap distance.

10. The turbofan engine as recited in claim 7, including a carrier supporting the intermediate gears relative to the sun gear and a ring gear circumscribing the intermediate gears, wherein a ring gear baffle is supported on the carrier.

11. The turbofan engine as recited in claim 10, wherein the ring gear baffle includes a wedge extending into a cavity defined between gear regions of the intermediate gears.

12. The turbofan engine as recited in claim 7, wherein the baffle defines a lubricant flow path around the at least two intermediate gears.

13. A method of assembling a fan drive gear system comprising:
    supporting a sun gear within a carrier;
    mounting a plurality of intermediate gears within the carrier in meshed engagement with the sun gear;
    mounting a ring gear circumscribing the plurality of intermediate gears;
    mounting at least one baffle between at least two of the plurality of intermediate gears that define a first gap distance between the intermediate gears within a first gap portion and second gap distance different than the first gap distance within a second gap portion proximate the meshed engagement between the intermediate gears and the sun gear, the sun gear including a first gear oprtion and a second gear portion, and extending a wedge of the baffle into a cavity between the first and second gear portions of the sun gear for circulating lubricant from the cavity.

14. The method as recited in claim 13, including defining the second gap distance to be greater than the first gap distance for defining a lubricant flow path away from the meshed engagement between the intermediate gears and the sun gear.

15. The method as recited in claim 13, including defining the second gap distance to be between 1.5 and 2.5 times greater than the first gap distance.

* * * * *

UNITED STATES PATENT AND TRADEMARK OFFICE
CERTIFICATE OF CORRECTION

| | | |
|---|---|---|
| PATENT NO. | : 10,267,232 B2 | Page 1 of 1 |
| APPLICATION NO. | : 14/763535 | |
| DATED | : April 23, 2019 | |
| INVENTOR(S) | : Michael E. McCune and Marc J. Muldoon | |

It is certified that error appears in the above-identified patent and that said Letters Patent is hereby corrected as shown below:

In the Claims

In Claim 13, Column 8, Line 41; replace "gear oprtion" with --gear option-- Both occurrences.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*